(12) United States Patent
Zhang (10) Patent No.: US 7,801,022 B2
(45) Date of Patent: Sep. 21, 2010

(54) METHOD FOR REDUCING CAPACITY OF VIRTUAL CONCATENATION GROUP AND COMMUNICATION NETWORK THEREOF

(75) Inventor: Xiaoyi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 612 days.

(21) Appl. No.: 11/626,208

(22) Filed: Jan. 23, 2007

(65) Prior Publication Data

US 2007/0147417 A1    Jun. 28, 2007

Related U.S. Application Data

(63) Continuation of application No. PCT/CN2005/001198, filed on Aug. 4, 2005.

(30) Foreign Application Priority Data

Aug. 4, 2004    (CN) .................... 2004 1 0055102

(51) Int. Cl.
*G01R 31/08* (2006.01)
(52) U.S. Cl. ...................... 370/216; 370/537
(58) Field of Classification Search ................ 370/465, 370/468, 537, 907, 254, 216
See application file for complete search history.

(56) References Cited

U.S. PATENT DOCUMENTS

| 6,714,544 B1 * | 3/2004 | Bosloy et al. ............ 370/395.1 |
| 6,965,612 B2 | 11/2005 | Chohan et al. |
| 7,020,158 B2 | 3/2006 | Rouaud |
| 7,058,008 B1 * | 6/2006 | Wilson et al. ............... 370/216 |

(Continued)

FOREIGN PATENT DOCUMENTS

CN    1440162 A    9/2003

(Continued)

OTHER PUBLICATIONS

"Link Capacity Adjustment Scheme (LCAS) for Virtual Concatenated Signals," ITU-Telecommunication Standardization Sector, ITU-T Recommendation G.7042/Y.1305 (Nov. 2001).

(Continued)

*Primary Examiner*—Derrick W Ferris
*Assistant Examiner*—Peter Cheng
(74) *Attorney, Agent, or Firm*—Leydig, Voit & Mayer, Ltd.

(57) ABSTRACT

Embodiments of the present invention provide a method for reducing the capacity of a Virtual Concatenation Group (VCG) and a VCG communication network. When a network management device sends a downlink-member removing command to remove a downlink member to a Sink in the VCG, the Sink receiving the downlink-member removing command in the VCG sends, to a Source, failure state information indicating that the downlink member will be removed; the Source receiving the failure state information in the VCG sends do-not-use information to the Sink indicating that the downlink member will not be used any longer, and the Sink removes the downlink member; the network management device sends an uplink-member removing command to remove an uplink member to the Source, the Source removes the uplink member which will not be used any longer. Thus, possibility of mis-operation can be avoided fundamentally and operational freedom of an operator is enhanced.

15 Claims, 4 Drawing Sheets

U.S. PATENT DOCUMENTS

| | | | |
|---|---|---|---|
| 7,518,990 B2 * | 4/2009 | Acharya et al. | 370/225 |
| 2003/0161344 A1 | 8/2003 | Maggi et al. | |
| 2004/0120362 A1 * | 6/2004 | Chohan et al. | 370/907 |
| 2005/0008042 A1 | 1/2005 | Rouaud | |
| 2005/0281197 A1 * | 12/2005 | Honda | 370/235 |

FOREIGN PATENT DOCUMENTS

| | | |
|---|---|---|
| EP | 1675292 A1 | 6/2006 |
| KR | 2004-0028013 A | 4/2004 |
| WO | WO 2004/062201 A1 | 7/2004 |

OTHER PUBLICATIONS

International Telecommunication Union (ITU-T), "Characteristics of Transport Equipment—Description Methodology and Generic Functionality," G.806, XP017404627 (Feb. 2004).

Gerdstrom, "Perceived Ambiguity in LCAS Procedure for VCG Size Reductions," ITU-T Draft Study Period 2001-2004, COM 15-D 1203-E, XP017417936 (Apr. 19, 2004).

Bellato, "Corrigendum 3 to the ITU-T Recommendation G.7042/Y.1305 (for consent to mormative text and agreement to non-normative text)," ITU-T Draft Study Period 2001-2004, Study Group 15, TD 49 (PLEN) (Apr. 19, 2004).

International Telecommunication Union (ITU-T), "Link Capacity Adjustment Scheme (LCAS) for Virtual Concatenated Signals," G.7042/Y.1305, XP002301051 (Feb. 2004).

Guang, "Proposal for VCG Member Hitless Deletion from LCAS Sink Side," ITU-T Draft Study Period 2005-2008, COM 15-D 286-E, XP017407402 (May 16, 2005).

European Patent Office, Search Report in European Application No. 05772829.7 (Jan. 20, 2010).

State Intellectual Property Office of the People'S Republic of China, Written Opinion of the International Searching Authority in International Patent Application No. PCT/CN2005/001198 (Nov. 10, 2005).

\* cited by examiner

| Note | | Mem n-1 | | | Men n (EOS) | | |
|---|---|---|---|---|---|---|---|
| | | CTRL | SQ | MST | CTRL | SQ | MST |
| 1 | initial state | NORM | n-2 | OK | EOS | n-1 | OK |
| 2 | the NMS sends a removing command to the Sk | NORM | n-2 | OK | EOS | n-1 | OK |
| 3 | Sk(removing_mem) sends MST=FAIL to the So | NORM | n-2 | OK | EOS | n-1 | FAIL |
| 4 | So(fault_mem) sends out DNU, and So(fault_mem-1) sends out the EOS | EOS | n-2 | OK | DNU | n-1 | FAIL |

METHOD FOR REDUCING CAPACITY OF VIRTUAL CONCATENATION GROUP AND COMMUNICATION NETWORK THEREOF

This application is a continuation of International Patent Application No. PCT/CN2005/001198, filed Aug. 4, 2005, which claims priority to Chinese Patent Application No. 200410055102.X, filed Aug. 4, 2004, all of which are hereby incorporated by reference.

FIELD OF THE TECHNOLOGY

The present invention relates to data communication technologies, and more particularly, to a method for reducing the capacity of a Virtual Concatenation Group (VCG) and a VCG communication network.

BACKGROUND OF THE INVENTION

Along with the development of modern data communications, demands for broadband service transmission are presented to network operators as well as challenges. Existing Synchronous Digital Hierarchy (SDH)/Synchronous Optical Networking (SONET) transmission networks have insufficient resources to transmit huge data flows generated by Internet Protocol (IP) core routers and Asynchronous Transfer Mode (ATM) exchanges. To satisfy the demands of broadband service transmission, a method in which existing devices will not be replaced is needed.

The largest Virtual Container (VC) in the existing transport network is VC-4. Although VC-4 belongs to a higher order VC, the only available transmission service bandwidth is 140 Mbps. With the development of ATM and IP networks, demands for bandwidth have already exceeded the capacity provided by one VC-4. According to several techniques developed so far, the bandwidths of multiple VC-4s can be combined to provide an interface with a high bandwidth to transmit broadband services.

A Contiguous Concatenation means that contiguous Container-n (C-n) (five standard containers are defined by G.709, which are C-11, C-12, C-2, C-3 and C-4) in one Synchronous Transmission Module level n (STM-N) are concatenated as a C-n-XC to form a whole structure to perform the transmission. The STM-N is a frame structure of an Synchronous Digital Hierarchy (SDH) signal, which is a block frame structure of 9 rows*270*N columns, and Telecommunication Standardization Sector of International Telecommunication Union (ITU-T) defines that the frame of STM-N is in a rectangle and block structure adopting a byte as a unit. It can be seen that the contiguous concatenated C-4-XC has only one column of Path Overhead (POH) indication, therefore a continuous bandwidth thereof must be maintained in the entire transmission process. The above technology needs support of all the devices by which the transmission passes in the network, whereas the majority of existing devices do not possess the capability.

A virtual concatenation means that VC-ns distributed in different STM-Ns are concatenated to form a VC-n-Xv, i.e., to form a VCG to perform the transmission. The VC-ns may be in the same route or in different routes. Each C-n in the VCG has an independent structure, i.e., has its own POH as well as an entire structure of VC-n. The virtual concatenation of several C-ns is equal to several interleaved VC-ns. It is only needed to provide special hardware support at the two ends of the concatenation in terms of the device.

The Link Capacity Adjustment Scheme (LCAS) is one of the technologies employed in virtual concatenation and capable of improving the performance of virtual concatenation, of which the basic principle is to utilize a reservation overhead byte of the SDH (the H4 bytes are utilized in the case of the higher order virtual concatenation, while the K4 bytes are utilized in the case of the lower order virtual concatenation) to transfer control information, so as to dynamically adjust the amount of VCs used for mapping the needed service to adapt to different demands for service bandwidth and increase bandwidth utilization. The LCAS protocol brings the following advantages: the network is more robust, the service may not be affected when the capacity of the VCG is adjusted, damaged link, i.e., the link where there is a failure, can be shielded initiatively so as to guarantee the service transmission, and when the damaged link recovers to a normal state, it can be utilized again to resume the bandwidth.

For better understanding, meanings of specific terms are defined as follows:

Link: a connection from one end to the other end in the network, corresponding to a group of members in the VCG, i.e., corresponding to the VCG itself An entire link includes an uplink and a downlink according to the transmission direction of data, and the data are transmitted from the uplink to the downlink.

Member: an individual container that belongs to a VCG.

VCG: a combination of a group of members related with each other, which is a logic link group with a higher capacity.

Source (So): a device end to transmit the data, i.e., an originating device end where the uplink is located.

Sink (Sk): a device end to receive the data, i.e., the device end where the downlink is terminated.

Both the So and the Sk possess the LCAS capability, i.e., each of them possesses a Link Capacity Adjustment Scheme Controller (LCASC). An uplink member hereinafter refers to a member of the VCG in the So LCAS device, and correspondingly, a downlink member refers to a member of the VCG in the Sk LCAS device.

The technical solution in the prior art supports the reduction of the capacity of a VCG in the manner of command, the command supported include: a command to reduce the capacity (to remove the members), including an uplink-member removing command and a downlink-member removing command.

As the existing solution defines only a method to reduce the capacity, i.e., to remove the members, in which the uplink member should be removed before the downlink member is removed, while no method in which the downlink member is removed before the uplink member is removed has been defined, there is a sequence requirement for supporting the two commands mentioned above to reduce the capacity (the uplink-member removing command and the downlink-member removing command). When a member is about to be removed, the uplink-member removing command must be used before the downlink-member removing command is used. An implementation method in the prior art to reduce the capacity of the VCG, i.e., to remove members in the VCG, is described in detail hereinafter.

Figure 1:
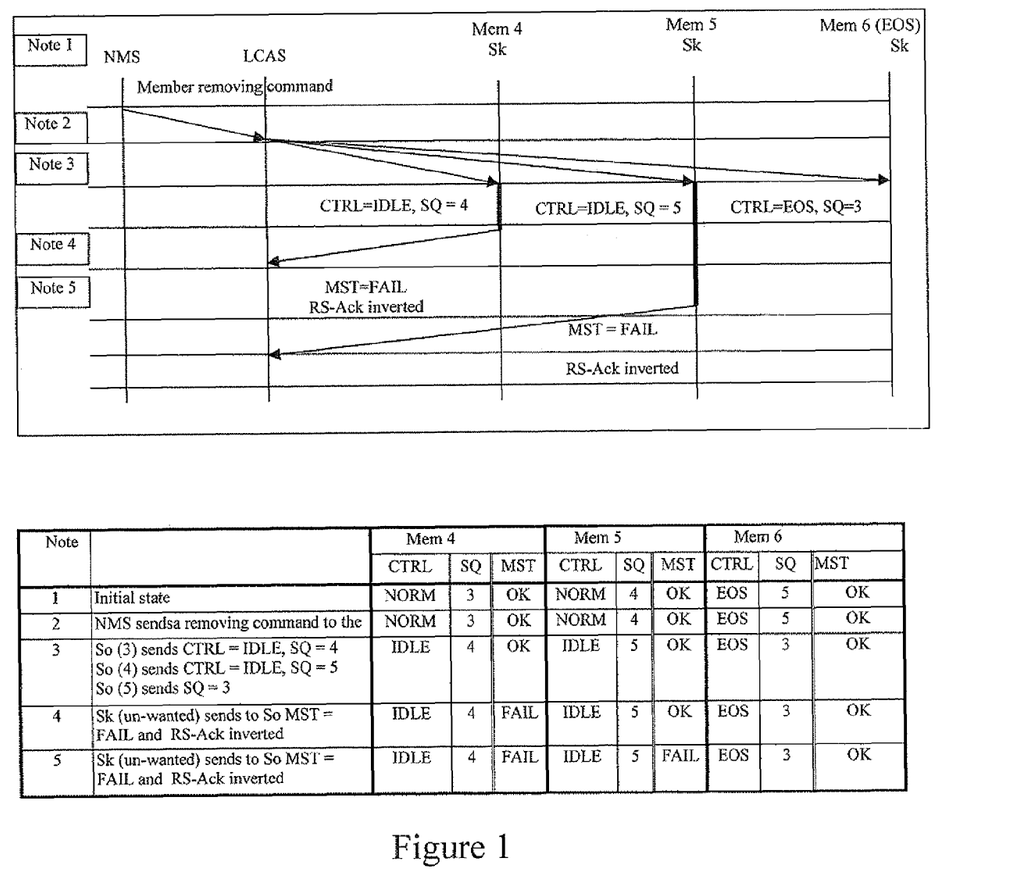
FIG. 1 is a sequence chart illustrating a process to remove a non member which is not the last one in a VCG in accordance with the related art.

FIG. 1 is a sequence chart illustrating the process to remove a member which is not the last one in a VCG in accordance with the related art. Member 4 (Mem 4) and Mem 5 will be removed from a VCG including 6 members, i.e., the multiple members to be removed do not include the last one in number in the VCG. The LCAS in the sequence chart is an So LCASC, which is the So of Mem 4, Mem 5 and Mem 6 at the same time, whereas the Sks of the three members are different devices.

Referring to FIG. 1, a Network Management System (NMS) sends an uplink-member removing command to the So LCASC, instructing it to remove the uplink members corresponding to Mem 4 and Mem 5 in the sequence chart, i.e., to remove the uplink members of the So, Mem 4 and Mem 5. The So sends CTRL=IDLE and Sequence Indicator (SQ) =4 to Mem 4 of the Sk, sends CTRL=IDLE and SQ=5 to Mem 5 of the Sk, and sends CTRL=End of Sequence (EOS) and SQ=3 to Mem 6 of the Sk. Upon receiving CTRL=IDLE, Mem 4 and Mem 5 of the Sk reorganize the service, and the removed members will not be used any longer. Then the Sk returns state information indicating the member state as failure and information indicating the changed member sequence to the So, i.e., return Member State (MST)=FAIL and Re-Sequence Acknowledge (RS-Ack) inverted information to the So. After that, Mem 4 and Mem 5 of the So are removed from the VCG, i.e., the capacity of the VCG is reduced, and Mem 6 becomes the last available member in the VCG, correspondingly, the SQs of previous Mem 4, Mem 5 and Mem 6 have changed.

Thus, the members of the So have been removed, i.e., the uplink members Mem 4 and Mem 5 have been removed.

Since the corresponding members of the Sk, i.e., downlink members Mem 4 and Mem 5, have already been in the failure state and will no longer be a service bearer, Mem 4 and Mem 5 of the Sk can be removed at this point. The specific process is that the NMS sends a downlink-member removing command to the Sk directly, and the Sk removes Mem 4 and Mem 5 directly. Certainly, Mem 4 and Mem 5 of the Sk may not be removed because they are already in the failure state and will not be used any longer.

Certainly, a response from the Sk to the So only aims to confirm that the member will not be used as an Sk any longer, if necessary, the NMS can perform a de-provisioning operation for the member. No de-provisioning operation is described in the sequence chart above.

A general principle to adjust the SQs in a REMOVE (REM) function includes: all the unnecessary members are re-assigned with an SQ higher than that of the member to which CRTL=EOS is sent; and all the members necessary to be reserved are re-assigned with multiple continuous SQs which are lower than that of the unnecessary members.

For example, suppose that a certain VCG includes seven members from A~G, the SQs thereof are from 0~6 respectively. When members C, D and G are removed, the SQ of each member in the VCG before and after the removing is shown in Table 1.

TABLE 1

|  |  | VC | | | | | | |
| --- | --- | --- | --- | --- | --- | --- | --- | --- |
|  |  | A | B | C | D | E | F | G |
| Before adjustment | SQ | 0 | 1 | 2 U | 3 U | 4 | 5 | 6 U |
| After adjustment | SQ | 0 | 1 | 4 | 5 | 2 | 3 | 6 |

Figure 2:
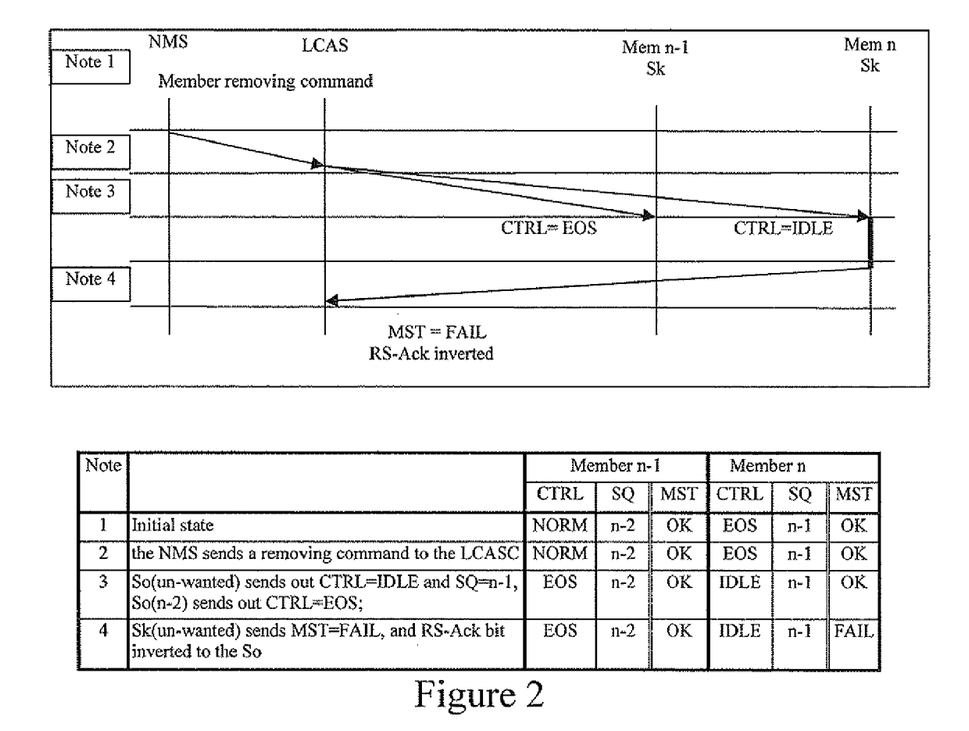
FIG. 2 is a sequence chart illustrating a process to remove the last member in a VCG in accordance with the related art.

FIG. 2 is a sequence chart illustrating the process to remove the last member in a VCG in accordance with the related art. The specific operation is nearly the same as that shown in FIG. 1, thus no detailed descriptions will be given. Compared with the operation illustrated in FIG. 1, the difference is that the So sends sequence terminal configuration information to the last member but one in number in the VCG after the removing operation is finished.

It can be seen that, in the existing process to remove the members, since only the method in which the uplink members are removed first is defined, when the capacity of the VCG is changed, particularly when the operation to reduce the capacity of the VCG is performed, the uplink members must be removed before the downlink members are removed. That is to say, the NMS may send the removing command to the So first instead of sending the removing command to the Sk first. As a result, a strict restriction is brought to an operation mode of the operator, i.e., the uplink-member removing command must be issued before the downlink-member removing command is issued.

In case of mis-operation of the operator, which makes the NMS issue a downlink-member removing command first, i.e., the removing command is sent to the Sk first, then the LCAS negotiation mechanism will be damaged, making the downlink members removed directly while the corresponding uplink members are not informed, which will lead to a link failure, e.g., a failure in service de-encapsulation and the like. As a result, the corresponding uplink members are unable to perform the negotiation with the downlink members such that the uplink members could not be removed. That is to say, if the operator works by mistake, i.e., issues a downlink-member removing command first, there will be a negative impact on the entire virtual concatenation service, leading to, e.g., an interrupted service that makes the LCAS lose the protection function.

SUMMARY OF THE INVENTION

Embodiments of the present invention provide a method for reducing the capacity of a Virtual Concatenation Group (VCG), and a VCG communication network to implement the method above, eliminating the restriction in which an uplink member must be removed before a downlink member is removed.

An embodiment of the present invention is given below to describe the technical solutions.

A method for reducing the capacity of a Virtual Concatenation Group (VCG) includes:

when a network management device sends a downlink-member removing command to remove a downlink member to a Sink in the VCG, the Sink that receives the downlink-member removing command in the VCG sending, to a Source, failure state information indicating that the downlink, member will be removed;

the Source that receives the failure state information in the VCG sending do-not-use information to the Sink indicating that the downlink member will not be used any longer, and the Sink removing the downlink member;

the network management device sending an uplink-member removing command to remove an uplink member to the Source, the Source removing the uplink member which will not be used any longer to complete operations of reducing the capacity of the VCG.

Preferably, the method further includes:

the Source sending sequence terminal configuration information to the last downlink member but one in the VCG of the Sk if the downlink member removed is the last one in number in the VCG.

Preferably, the method further includes: performing a loading/unloading service related to the processes of removing the uplink member and the downlink member in a channel which is in a normal operating state.

Preferably, the method further includes:

performing other operations to change the capacity of the VCG between the process of removing the downlink member and the process of removing the uplink member.

Another embodiment of the present invention is given below to describe the technical solutions.

A Virtual Concatenation Group (VCG) communication network includes a network management device for reducing the capacity of a VCG by removing members, and at least two devices supporting the Link Capacity Adjustment Scheme (LCAS) protocol, including a device serving as a Source in the VCG and a device serving as a Sink in the VCG;

in the VCG communication network, the network management device is configured to send a downlink-member removing command to remove a downlink member to the Sink in the VCG and send an uplink-member removing command to remove an uplink member to the Source;

the Sink is configured to send failure state information to a Source indicating that the downlink member will be removed when receiving the downlink-member removing command in the VCG, and remove the downlink member when receiving do-not-use information of the downlink member from the Source;

the Source is configured to send the do-not-use information of the downlink member to the Sink indicating that the downlink member will not be used any longer when receiving the failure state information in the VCG and remove an uplink member which will not be used any longer to complete operations of reducing the capacity of the VCG when receiving the uplink-member removing command.

Preferably, the network management device includes:

a module for sending the downlink-member removing command to the Sink indicating that the downlink member in the Sink should be removed; and a module for sending the uplink-member removing command to the Source corresponding to the Sink, indicating that the uplink member in the Source corresponding to the downlink member should be removed.

Preferably, the Sink includes a first core processing module for responding to commands and executing corresponding operations, and a module for sending failure state information; and the first core processing module is configured to drive, when receiving the downlink-member removing command from the network management device, the module for sending failure state information to send the failure state information to the Source corresponding to the Sink to show that the downlink member will be removed and remove the downlink member when receiving the do-not-use information of the downlink member from the Source.

The Source includes a second core processing module for responding to commands and executing corresponding operations, and a module for sending do-not-use information; and the second core processing module is configured to drive, when receiving the failure state information, the module for sending do-not-use information to send the do-not-use information of the downlink member to the Sink and remove, when receiving the uplink -member removing command, the uplink member which will not be used any longer.

The Source further include a module for sending sequence terminal configuration information, and the module sends sequence terminal configuration information to the last member but one in number in the VCG of the Sink when the downlink member to be removed is the last one in number of the VCG.

In the method provided by the embodiments of the present invention, when a certain Sink receives a downlink-member removing command to remove a downlink member from the network management device first, the Sink receiving the removing command sends failure state information to the Source corresponding to the Sink indicating that the downlink member will be removed; the Source receiving the failure state information sends do-not-use information to the Sink indicating the downlink member will not be used any longer, and the Sink removes the downlink member; the network management device sends an uplink-member removing command to remove an uplink member to the Source, and the Source removes the uplink member which will not be used any longer, to complete operations of removing the uplink member.

At the same time, the embodiments of the present invention further provide a VCG communication network to implement the method to reduce the capacity of the VCG. Thus, through the method and communication network provided in the embodiments of the present invention, the removing of a link, i.e. the function to reduce the capacity of the link, may be implemented by removing the downlink members first, then removing the uplink members. Thus, no bad impact occurs to the service, while the operation freedom of the operators is enhanced with the elimination of the operation restriction. As the existing protocol supports to remove the uplink members first, then to remove the downlink members, and the embodiments of the present invention provides a method to remove the downlink members first, then to remove the uplink members, possibility of mis-operation may be avoided fundamentally, and at the same time the bad impact on the entire virtual concatenation service for removing the downlink members first existed in the prior art may be eliminated. Furthermore, the state diagram of the solution is totally based on the existing state diagram of the LCAS, which can guarantee compatibility and inter-operability between the devices to a large extent.

EMBODIMENTS OF THE INVENTION

Embodiments are described hereinafter with reference to accompanying drawings.

Figure 3:
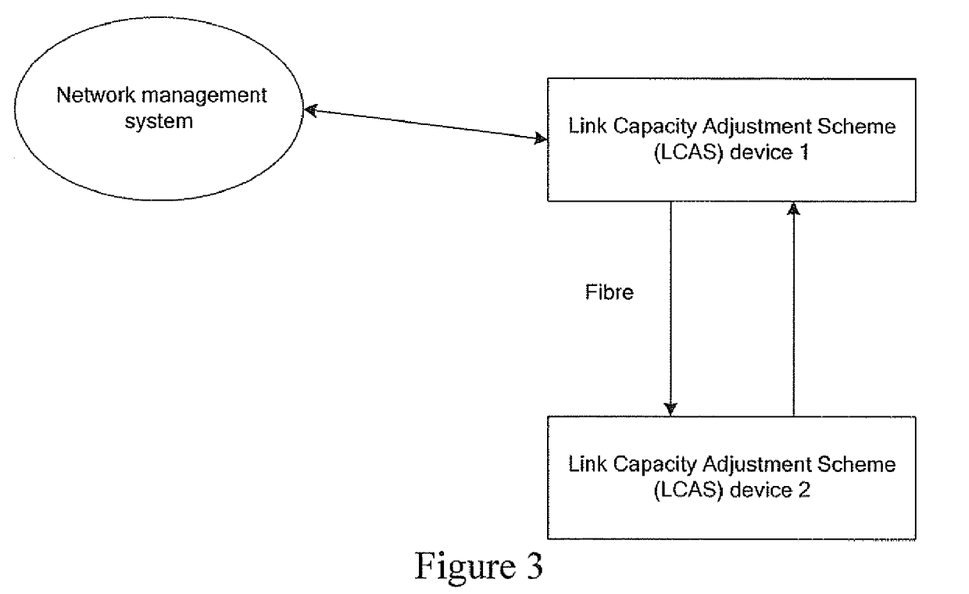
FIG. 3 is a schematic diagram illustrating a virtual concatenation communication network which may reduce the capacity of a VCG in accordance with an embodiment of the present invention.

FIG. 3 is a schematic diagram illustrating a virtual concatenation communication network which may reduce the capacity of a VCG in accordance with an embodiment of the present invention. The VCG communication network in accordance with the embodiment of the present invention includes a network management device for reducing the capacity of the VCG by removing members, and more than one device supporting the LCAS protocol. Part of the devices supporting the LCAS protocol is taken as the So of the VCG, and the rest is taken as the Sk of the VCG. The devices supporting the LCAS protocol include core processing modules for responding to commands and executing operations, i.e., both the So and the Sk include a core processing module for responding to commands and executing operations. The network management device includes a module for sending a downlink-member removing command and a module for sending an uplink-member removing command, furthermore, the Sk includes a module for sending failure state information, and the So includes a module for sending do-not-use information, i.e., the information indicating that a certain member will not be used any longer.

The module in the network management device for sending a downlink-member removing command is configured to send the downlink-member removing command to the Sk, indicating that a certain downlink member in the Sk should be removed. And, the module in the network management device for sending an uplink-member removing command is configured to send the uplink-member removing command to the So corresponding to the Sk, indicating that an uplink member in the So corresponding to the downlink member should be removed.

The Sk includes a first core processing module for responding to the commands and executing the corresponding operations. The first core processing module drives, when receiving the downlink-member removing command from the network management device, the module for sending failure state information to send failure state information to the So corresponding to the Sk to indicate that the downlink member will be removed, and removes the downlink member when receiving do-not-use information of the downlink member from the So.

The So includes a second core processing module for responding to the commands and executing corresponding operations. The second core processing module drives, when receiving the failure state information, the module for sending do-not-use information to send the do-not-use information to the Sk, and removes the uplink member when receiving a command to remove the uplink member which will not be used any longer.

Furthermore, the So also includes a module for sending sequence terminal configuration information. Thus, this module sends sequence terminal configuration information to the last member but one in number of the VCG of the Sk when the member to be removed is the last one in number of the VCG.

The implementing method to reduce the capacity of the VCG, i.e., to remove members in the VCG, is hereinafter described in detail.

Figure 4:
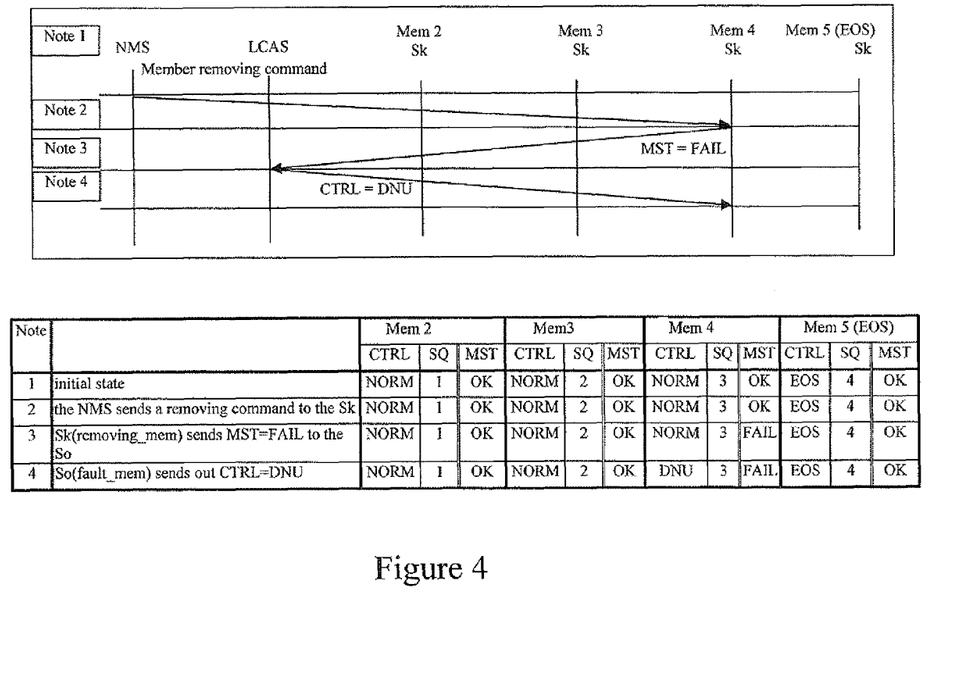
FIG. 4 is a sequence chart illustrating a process to send a downlink-member removing command first when a member, which is not the last one, of a VCG is about to be removed in accordance with an embodiment of the present invention.

FIG. 4 is a sequence chart illustrating a process to send a downlink-member removing command first when a member, which is not the last one, of a VCG is about to be removed in accordance with an embodiment of the present invention. In the embodiment the LCAS in the chart is an So LCASC, which is the So of uplink members Mem 2, Mem 3, Mem 4 and Mem 5 and is not the same device as the Sks of downlink members Mem 2, Mem 3, Mem 4 and Mem 5, the Sks of downlink members Mem 2, Mem 3, Mem 4 and Mem 5 are different devices, either. In this embodiment Mem 4 is about to be removed.

The network management device sends a downlink-member removing command to the Sk where the downlink member Mem 4 is located, indicating that the downlink member Mem 4 should be removed. Upon receiving the removing command, the Sk sends failure state information to the So LCASC corresponding to the Sk, indicating that the downlink member will be removed, i.e., sends the information of MST=FAIL to the So. Upon receiving the failure state information, the So LCASC sends information to the Sk indicating that the downlink member will not be used any longer, i.e., sends information of CTRL=DNU (Do Not Use) to the Sk, and the Sk removes the downlink member upon receiving the information. Thus, the removing of downlink member Mem 4 is finished.

Figure 5:
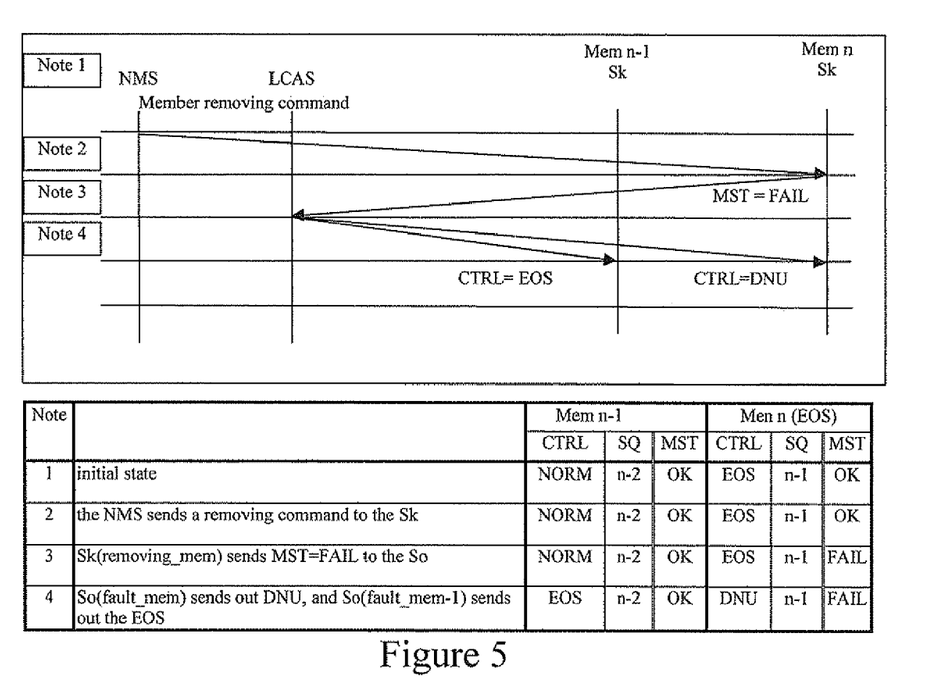
FIG. 5 is a sequence chart illustrating a process to send a downlink-member removing command first when the last member of a VCG is about to be removed in accordance with an embodiment of the present invention.

FIG. 5 is a sequence chart illustrating a process to send a downlink-member removing command first when the last member in number of a VCG is about to be removed in accordance with an embodiment of the present invention. In the embodiment, the LCAS in the sequence chart is an So LCASC, which is the So of uplink members Mem n-1 and Mem n and is not the same device as the Sks of downlink members Mem n-1 and Mem n; besides, the Sks of downlink members Mem n-1 and Mem n are different devices, either. In this embodiment, Mem n is about to be removed.

The network management device sends a downlink-member removing command to the Sk where the downlink member Mem n is located, indicating that the downlink member Mem n should be removed. Upon receiving the removing command, the Sk sends failure state information to the So LCASC corresponding to the Sk, indicating that the downlink member will be removed, i.e., sends the information of MST=FAIL to the So. Upon receiving the failure state information, the So LCASC sends information to the Sk, indicating that the downlink member will not be used any longer, i.e., sends information of CTRL=DNU to the Sk, and the Sk removes the downlink member upon receiving the information, thus the removing of the downlink member is completed. At the same time, the So sends sequence terminal configuration information to the last member but one in the VCG of the Sk, i.e., sends the information of CTRL=EOS to Mem n-1. Thus, the removing of the downlink member Mem n is finished. The removing method shown in FIG. 5 is basically the same as that illustrated in FIG. 4, whereas the difference is that a process is added in which the So sends sequence terminal configuration information to the last member but one in number of the VCG of the Sk.

Thus, the function to remove the downlink members first is achieved successfully, and the corresponding method to remove the uplink members will be described hereinafter.

Since the corresponding uplink members have already been in the failure state, they will no longer be a bearer of service, thus the uplink members can be removed directly. The state needed to be changed is that the value of CTRL of the uplink members is configured as default, i.e., CTRL=IDLE. The specific implementation process is that: the network management device sends a removing command to the So where the uplink members to be removed are located, and the So directly removes the uplink members which will not be used any longer, i.e., configuring CTRL=IDLE, to complete the removing operation of the members. As no negotiation with the Sk is needed in the whole process, no sequence chart of the operation but the literal description thereof is given.

By far, the function to reduce the capacity of the link can be implemented by removing the downlink members before removing corresponding uplink members.

By the characteristics of the LCAS, during the process of removing the members, i.e., during the process of removing the downlink members and the uplink members, a loading/unloading service related to the So and the Sk is performed in a channel of normal operating mode/EOS, which may guarantee that the service can be transmitted in a damage-free manner, and no packets are dropped in the adjustment process of the service.

Furthermore, other operations to change the capacity can be performed between the process of removing the downlink members and the process of removing the uplink members, i.e., the two processes above may not be performed continuously, and other processes can be inserted between them.

The above implementation is on the basis of compliance with the LCAS protocol, which provides a supplementary function for existing method for removing the uplink members first. The supplementary function refers to removing the downlink members first, and then removing the corresponding uplink members. A protocol state machine applied in the embodiment of the present invention still strictly complies with the previous protocol state diagram without adding or changing the previous protocol state diagram, while a method capable of implementing the function following the state diagram is put forward. Therefore, good compatibility and interoperability between the devices can be guaranteed.

It can be seen that, as the method for removing the uplink members before removing the downlink members has already been provided in the prior art, and the embodiments of the present invention provide a method for removing the downlink members before removing the uplink members, the network management device can remove a pair of uplink member and downlink member between the So and the Sk in a random sequence by combining the existing technology with the contents of the embodiments of the present invention, which may eliminate mis-operation fundamentally.

An embodiment to implement the operation process to remove the downlink member and the uplink member is given hereinafter with reference to FIG. 6.

Figure 6:
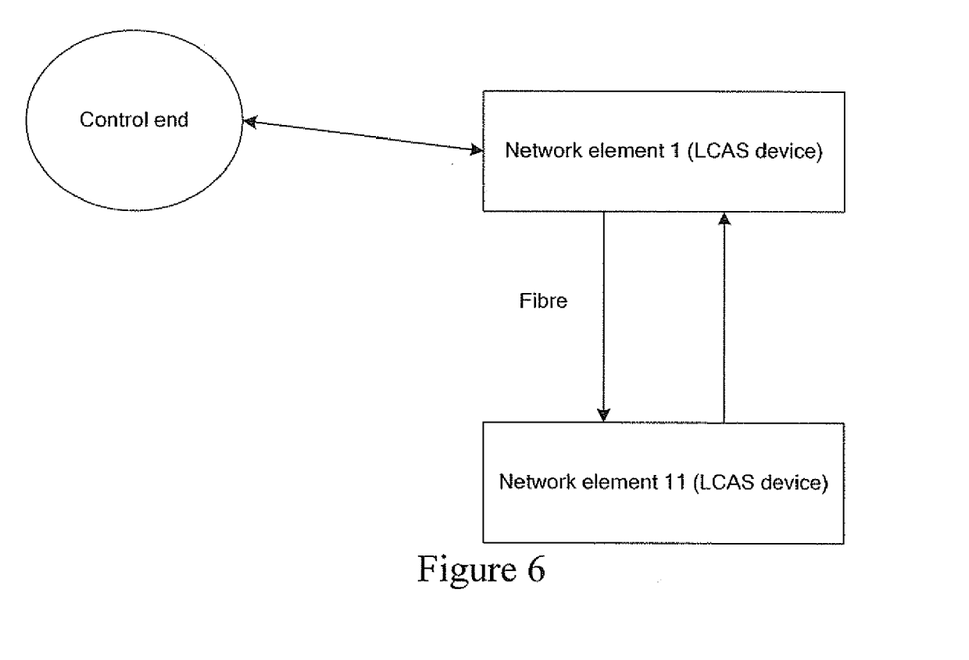
FIG. 6 is a schematic diagram illustrating an exemplary embodiment of the present invention.

Refer to FIG. 6, a VCG of VC12 level is configured between network elements of No. 1 and No. 11, and the LCAS is enabled. Then, members of No. 1-15 are added to VCTrunk2, and the downlink members of No. 1-10 of No. 11 network element are directly removed, then the uplink members of No. 1-10 of No. 11 network element are removed.

And the specific operation process is as follows:
configure the VCG of VCTrunk2 as LCAS enabled, indicating that the LCAS function will be used in VCTrunk2; after that, add bi-directional members of No. 1-15 to VCTrunk2 on network elements of No. 1 and No. 11; once the members are successfully added, the removing operation is started;

a command is sent to No. 11 network element to remove downlink members of No. 1-10, and No. 11 network element returns MST=FAIL to No. 1 network element; upon receiving information of MST=FAIL, namely the failure state information, No. 1 network element sends CTRL=DNU to No. 11 network element; upon receiving information of CTRL=DNU, namely the information indicating that the member will not be used any longer, No. 11 network element removes downlink members of No. 1-10 of itself; after the successful removing, the bandwidth will be reduced;

a command is sent to No. 1 network element to remove uplink members of No. 1-10; upon receiving the removing command, No. 1 network element configures uplink members of No. 1-10 of itself as CTRL=IDLE, thus removing the uplink members of No. 1-10.

According to tests, no service is interrupted and no packet is dropped during the executing process of the above removing command.

The foregoing is only preferred embodiments of the present invention and is not for use in limiting protection scope thereof, Any change or substitution, within the technical scope of the present disclosure, easily occurring to those skilled in the art should be covered in the protection scope thereof.

What is claimed is:

1. A method for reducing the capacity of a Virtual Concatenation Group (VCG), comprising:
when a network management device sends a downlink-member removing command to remove a downlink member to a Sink in the VCG,
sending, by the Sink that receives the downlink-member removing command from the network management device in the VCG to a Source, failure state information indicating that the downlink member will be removed;
sending, by the Source that receives the failure state information in the VCG, do-not-use information to the Sink indicating that the downlink member will not be used any longer, and removing, by the Sink, the downlink member after receiving the do-not-use information from the Source;
sending, by the network management device, an uplink-member removing command to remove an uplink member to the Source after the Sink removes the downlink member, and removing, by the Source, the uplink member which will not be used any longer to complete operations of reducing the capacity of the VCG when receiving the uplink-member removing command from the network management device;
the Sink and the Source supporting Link Capacity Adjustment Scheme (LCAS) protocol.

2. The method of claim 1, further comprising:
sending, by the Source, sequence terminal configuration information to the last downlink member but one in the VCG of the Sink if the downlink member removed is the last one in number in the VCG.

3. The method of claim 2, further comprising: performing a loading/unloading service related to the processes of removing the uplink member and the downlink member in a channel which is in a normal operating state.

4. The method of claim 3, further comprising:
performing other operations to change the capacity of the VCG between the process of removing the downlink member and the process of removing the uplink member.

5. The method of claim 1, further comprising: performing a loading/unloading service related to the processes of removing the uplink member and the downlink member in a channel which is in a normal operating state.

6. The method of claim 5, further comprising:
performing other operations to change the capacity of the VCG between the process of removing the downlink member and the process of removing the uplink member.

7. A Virtual Concatenation Group (VCG) communication network, comprising a network management device for reducing the capacity of a VCG by removing members, and at least two devices supporting Link Capacity Adjustment Scheme (LCAS) protocol, including a device serving as a Source in the VCG and a device serving as a Sink in the VCG; wherein
when the network management device first sends a downlink-member removing command to remove a downlink member to the Sink in the VCG,
the Sink is configured to send failure state information to a Source indicating that the downlink member will be removed when receiving the downlink-member removing command in the VCG from the network management device;
the Source is configured to send do-not-use information of the downlink member to the Sink indicating that the downlink member will not be used any longer when receiving the failure state information in the VCG;

the Sink is further configured to remove the downlink member when receiving the do-not-use information of the downlink member from the Source;

the network management device is further configured to send an uplink-member removing command to remove an uplink member to the Source after the Sink removes the downlink member; and the Source is further configured to remove the uplink member which will not be used any longer to complete operations of reducing the capacity of the VCG when receiving the uplink-member removing command from the network management device.

8. The VCG communication network of claim 7, wherein the Source comprises a second core processing module for responding to commands and executing corresponding operations, and a module for sending do-not-use information;

the second core processing module is configured to drive, when receiving the failure state information, the module for sending do-not-use information to send the do-not-use information of the downlink member to the Sink and remove, when receiving the uplink-member removing command, the uplink member which will not be used any longer.

9. The VCG communication network of claim 8, wherein the Source further comprises a module for sending sequence terminal configuration information, and the module sends sequence terminal configuration information to the last member but one in number in the VCG of the Sink when the downlink member to be removed is the last one in number of the VCG.

10. The VCG communication network of claim 7, wherein the network management device comprises:

a module for sending the downlink-member removing command to the Sink indicating that the downlink member in the Sink should be removed; and a module for sending the uplink-member removing command to the Source corresponding to the Sink, indicating that the uplink member in the Source corresponding to the downlink member should be removed.

11. The VCG communication network of claim 10, wherein the Source comprises a second core processing module for responding to commands and executing corresponding operations, and a module for sending do-not-use information;

the second core processing module is configured to drive, when receiving the failure state information, the module for sending do-not-use information to send the do-not-use information of the downlink member to the Sink and remove, when receiving the uplink-member removing command, the uplink member which will not be used any longer.

12. The VCG communication network of claim 11, wherein the Source further comprises a module for sending sequence terminal configuration information, and the module sends sequence terminal configuration information to the last member but one in number in the VCG of the Sink when the downlink member to be removed is the last one in number of the VCG.

13. The VCG communication network of claim 7, wherein the Sink comprises a first core processing module for responding to commands and executing corresponding operations, and a module for sending failure state information;

the first core processing module is configured to drive, when receiving the downlink-member removing command from the network management device, the module for sending failure state information to send the failure state information to the Source corresponding to the Sink to show that the downlink member will be removed and remove the downlink member when receiving the do-not-use information of the downlink member from the Source.

14. The VCG communication network of claim 13, wherein the Source comprises a second core processing module for responding to commands and executing corresponding operations, and a module for sending do-not-use information;

the second core processing module is configured to drive, when receiving the failure state information, the module for sending do-not-use information to send the do-not-use information of the downlink member to the Sink and remove, when receiving the uplink-member removing command, the uplink member which will not be used any longer.

15. The VCG communication network of claim 14, wherein the Source further comprises a module for sending sequence terminal configuration information, and the module sends sequence terminal configuration information to the last member but one in number in the VCG of the Sink when the downlink member to be removed is the last one in number of the VCG.

* * * * *